(12) United States Patent
Karczewicz (10) Patent No.: US 8,238,428 B2
(45) Date of Patent: Aug. 7, 2012

(54) PIXEL-BY-PIXEL WEIGHTING FOR INTRA-FRAME CODING

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1090 days.

(21) Appl. No.: 12/040,673

(22) Filed: Feb. 29, 2008

(65) Prior Publication Data

US 2008/0260031 A1    Oct. 23, 2008

Related U.S. Application Data

(60) Provisional application No. 60/912,364, filed on Apr. 17, 2007.

(51) Int. Cl.
*H04N 11/04* (2006.01)
(52) U.S. Cl. .................................. 375/240.15
(58) Field of Classification Search .................. 375/240, 375/240.12, 240.15, 240.29
See application file for complete search history.

(56) References Cited

U.S. PATENT DOCUMENTS

| | | | |
|---|---|---|---|
| 6,654,503 B1 | 11/2003 | Sudharsanan et al. | |
| 7,142,231 B2* | 11/2006 | Chipchase et al. | 348/14.02 |
| 7,664,184 B2 | 2/2010 | Reznic et al. | |
| 7,751,479 B2 | 7/2010 | Paniconi et al. | |
| 2003/0223493 A1 | 12/2003 | Ye et al. | |
| 2005/0243920 A1 | 11/2005 | Murakami et al. | |
| 2006/0120456 A1 | 6/2006 | Tasaka et al. | |
| 2006/0153295 A1 | 7/2006 | Wang et al. | |
| 2006/0218482 A1 | 9/2006 | Ralston et al. | |
| 2007/0002945 A1 | 1/2007 | Kim | |
| 2007/0070082 A1* | 3/2007 | Brennan | 345/592 |

FOREIGN PATENT DOCUMENTS

| | | |
|---|---|---|
| CN | 1662066 A | 8/2005 |
| JP | 1155678 A | 6/1989 |
| JP | 2070127 A | 3/1990 |
| JP | 2002135126 A | 5/2002 |
| JP | 2006295408 A | 10/2006 |
| JP | 2008022405 A | 1/2008 |
| WO | WO2005107267 A1 | 11/2005 |
| WO | WO2008088140 A1 | 7/2008 |

OTHER PUBLICATIONS

VCEG-N54 is an ITU-T VCEG Group meeting contribution submitted by Greg Conklin of RealNetworks.
JVT-B118r4 was submitted to the JVT ISO/IEC MPEG/VCEG group by Thomas Wiegand and Gary Sullivan.
Fu, et al.: "A Comparative Study of Compensation Techniques in Directional DCT's," IEEE International Symposium on Circuits and Systems (ISCAS) 2007, pp. 521-524, May 27-30, 2007.
Karczewicz, M.: "Improved Intra Coding," ITU-Telecommunications Standardization Sector, Study Group 16, Question 6. Video Coding Experts Group (VCEG), Document No. VCEG-AF15, pp. 1-4, XP030003536, 32nd Meeting: San Jose, CA, USA, Apr. 20-21, 2007.
Robert, et al.: "Improving Intra mode coding in H.264/AVC through block oriented transforms," 2006 IEEE 8th Workshop on Multimedia Signal Processing, pp. 382-386. Oct. 3-6, 2006.
Sekiguchi, et al.: "Results of CE on Separate Prediction Modes for 4:4:4 Coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, 18th Meeting: Bangkok. TH. Source: Mitsubishi Electric Corporation. Jan. 14-20, 2006.
Tan, et al.: "Spatially Compensated Block-Based Transform," Proceedings of the Seventh IASTED International Conference Signal and Image Processing, pp. 92-97, XP008097050, Aug. 15, 2005.
Xu, et al.: "Lifting Based Directional DCT-Like Transform for Image Coding," IEEE International Conference on Image Processing (ICIP) 2007, vol. 3, pp. III-185-III-188.
Yu, et al.: "Low Complexity Intra Prediction," ITU-Telecommunications Standardization Sector, Study Group 16, Question 6, Video Coding Experts Group (VCEG), Document No. VCEG-Z14r1, pp. 1-4, 26th Mooting: Busan, KR, Apr. 16-22, 2005.
Zeng, et al.: "Directional Discrete Cosine Transforms for Image Coding," 2006 IEEE International Conference on Multimedia and Expo, pp. 721-724, Jul. 9-12, 2006.
Draft ISO/IEC 14496-10: 2002(E) Section 9.1.5.1: "Text of Final Committee Draft of Joint Video Specification (ITU-T Rec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002.
ITU-T H.264; "Series H: Audiovisual and Multimedia Systems Infrastructure of audiovisual services-Coding of moving video; Advanced video coding for generic audiovisual services," pp. 1-341, Telecommunication Standardization Sector of ITU, International Telecommunication Union, Mar. 2005.
International Search Report—PCT/US2008/060537, International Searching Authority—European Patent Office—Oct. 15, 2008.
Written Opinion—PCT/US2008/060537, International Searching Authority—European Patent Office—Oct. 15, 2008.
"Advanced Video Coding for Generic Audiovisual Services," ITU-T Standard Pre-Published (P), International Telecommunication Union, Geneva, N. H264 3/5, Mar. 1, 2005, XP002448756.
Bing Zeng et al: "Directional Discrete Cosine Transforms for Image Coding" Multimedia and Expo, 2006 IEEE International Conference on, IEEE, Jul. 1, 2006 ,pp. 721-724, XP031 032937 ISBN: 97S-1-4244-0366-0.
International Search Report—PCT/US2008/060535, International Searching Authority—European Patent Office—Oct. 14, 2008.

(Continued)

*Primary Examiner* — Dang Ton
*Assistant Examiner* — Nourali Mansoury
(74) *Attorney, Agent, or Firm* — John G. Rickenbrode (57) ABSTRACT

Techniques for improving the accuracy of prediction in intra-frame coding. A prediction mode can specify a pixel along a direction independently of other pixels along the same direction. In an embodiment, an encoder selects a prediction mode to best represent the image block. In an alternative embodiment, a decoder reconstructs each pixel in the image block by weighting neighboring pixels according to a weight matrix specified by the prediction mode.

21 Claims, 6 Drawing Sheets

OTHER PUBLICATIONS

International Search Report—PCT/US2008/060539, International Searching Authority—European Patent Office—Oct. 31, 2008.
"Text of ISO/ IEC 14496-10 FCD Advanced Video Coding" Video Standards and Drafts, various authors, No. N4920, Aug. 11, 2002, XP030012343, Section 9.1.5.1, p. 83 with figure 9-1.
Written Opinion—PCT/US2008/060535, International Searching Authority—European Patent Office—Oct. 14, 2008.
Written Opinion—PCT/US2008/060539, International Searching Authority—European Patent Office—Oct. 31, 2008.
Yu L, Feng Y.: "Low-complexity intra prediction" Video Standards and Drafts, No. VCEG-Z14r1, Apr. 18, 2005, XP030003459.
Fu, Jingjing, et al, "Diagonal Discrete Cosine Transforms for Image Coding," (Nov. 2, 2006), Advances in Multimedia Information Processing—Proceedings of the 7th Pacific Rim Conference on Multimedia, PCM 2006, Huangzhou, China, Nov. 2-4, 2006 Lecture Notes in Computer Science;LNCS, Springer, Berlin, DE, pp. 150-158, XP019047687, ISBN: 978-3-540-48766-1.
Taiwan Search Report—TW097114019—TIPO—Mar. 7, 2012.

* cited by examiner

PRIOR ART
FIG. 1

PRIOR ART

PRIOR ART

FIG. 3

$w^0_{a,X}=0$ $\quad w^0_{a,A}=1$ $\quad w^0_{a,B}=0$ $\quad w^0_{a,C}=0$ $\quad w^0_{a,D}=0$ $\quad w^0_{a,E}=0$ $\quad w^0_{a,F}=0$ $\quad w^0_{a,G}=0$ $w^0_{a,I}=0 \quad\quad \boldsymbol{p_a}$ $w^0_{a,J}=0$ $w^0_{a,K}=0$ $w^0_{a,L}=0$

FIG 4A $w^0_{a,X}=0$ $\quad w^0_{a,A}=0.9$ $\quad w^0_{a,B}=0$ $\quad w^0_{a,C}=0$ $\quad w^0_{a,D}=0$ $\quad w^0_{a,E}=0$ $\quad w^0_{a,F}=0$ $\quad w^0_{a,G}=0$ $w^0_{a,I}=0$ $w^0_{a,J}=0.1 \quad\quad \boldsymbol{p_e}$ $w^0_{a,K}=0$ $w^0_{a,L}=0$

PIXEL-BY-PIXEL WEIGHTING FOR INTRA-FRAME CODING

CLAIM OF PRIORITY

This patent application is based on and claims priority to U.S. patent application Ser. No. 60/912,364, filed Apr. 17, 2007, and is a co-pending application of U.S. patent application Ser. No. 12/040,633, filed Feb. 29, 2008, entitled Directional Transforms For Intra-Coding, and U.S. patent application Ser. No. 12/040,696, filed Feb. 29, 2008, entitled Mode Uniformity Signaling For Intra-Coding, all of which can be assigned to the assignee of the present invention, the contents of which are hereby expressly incorporated by reference herein.

TECHNICAL FIELD

The disclosure relates to digital video processing and, more particularly, to techniques for intra-frame video encoding and decoding.

BACKGROUND

In video encoding, a frame of a video sequence may be partitioned into rectangular regions or blocks. A video block may be encoded in Intra-mode (I-mode) or Inter-mode (P-mode).

Figure 1:
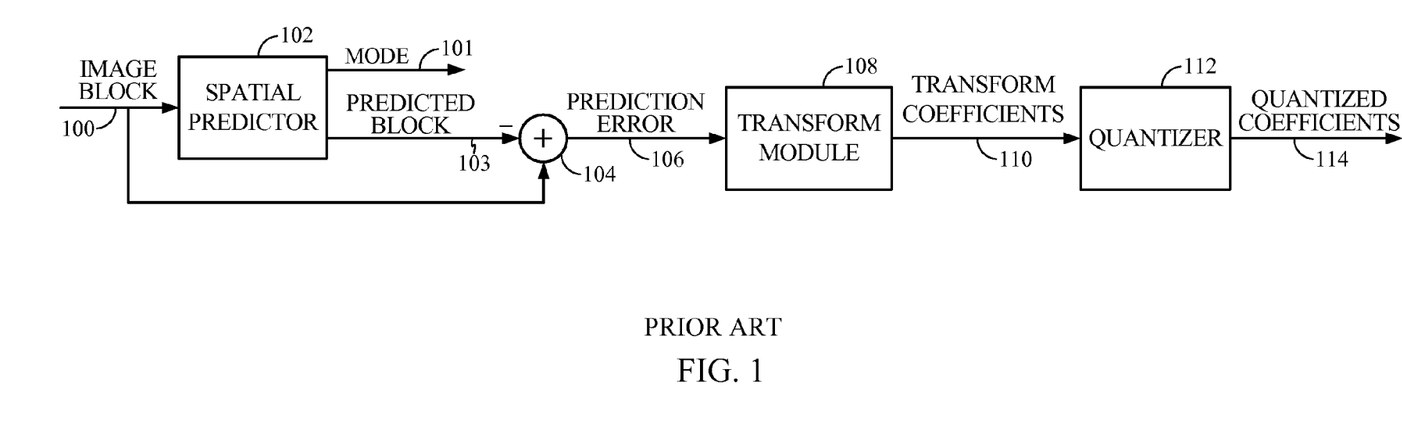
FIG. 1 shows a diagram of a prior art video encoder for the I-mode.

FIG. 1 shows a diagram of a prior art video encoder for the I-mode. In FIG. 1, a spatial predictor 102 forms a predicted block 103 from video block 100 using pixels from neighboring blocks in the same frame. The neighboring blocks used for prediction may be specified by a prediction mode 101. A summer 104 computes the prediction error 106, i.e., the difference between the image block 100 and the predicted block 103. Transform module 108 projects the prediction error 106 onto a set of basis or transform functions. In typical implementations, the transform functions can be derived from the discrete cosine transform (DCT), Karhunen-Loeve Transform (KLT), or any other functions.

The transform module 108 outputs a set of transform coefficients 110 corresponding to the weights assigned to each of the transform functions. For example, a set of coefficients $\{c_0, c_1, c_2, \ldots, c_N\}$ may be computed, corresponding to the set of transform functions $\{f_0, f_1, f_2, \ldots, f_N\}$. The transform coefficients 110 are subsequently quantized by quantizer 112 to produce quantized transform coefficients 114. The quantized coefficients 114 and prediction mode 101 may be transmitted to the decoder.

Figure 1A:
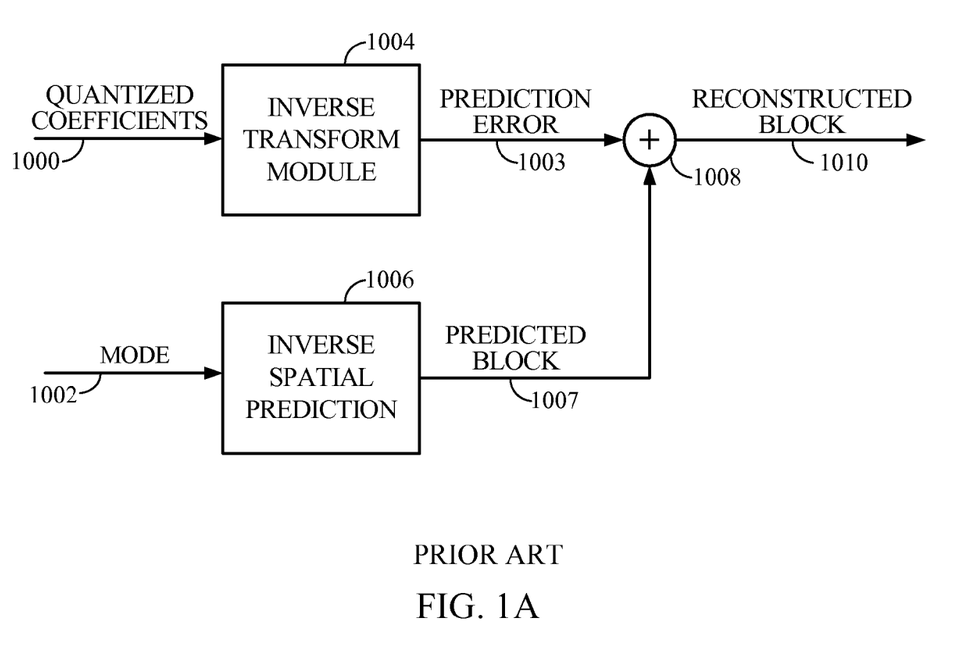
FIG. 1A depicts a video decoder for the I-mode.

FIG. 1A depicts a video decoder for the I-mode. In FIG. 1A, quantized coefficients 1000 are provided by the encoder to the decoder, and supplied to the inverse transform module 1004. The inverse transform module 1004 reconstructs the prediction error 1003 based on the coefficients 1000 and the fixed set of transform functions, e.g., $\{f_0, f_1, f_2, \ldots, f_N\}$. The prediction mode 1002 is supplied to the inverse spatial prediction module 1006, which generates a predicted block 1007 based on pixel values of already decoded neighboring blocks. The predicted block 1007 is combined with the prediction error 1003 to generate the reconstructed block 1010. The difference between the reconstructed block 1010 and the original block 100 in FIG. 1 is known as the reconstruction error.

Figure 2:
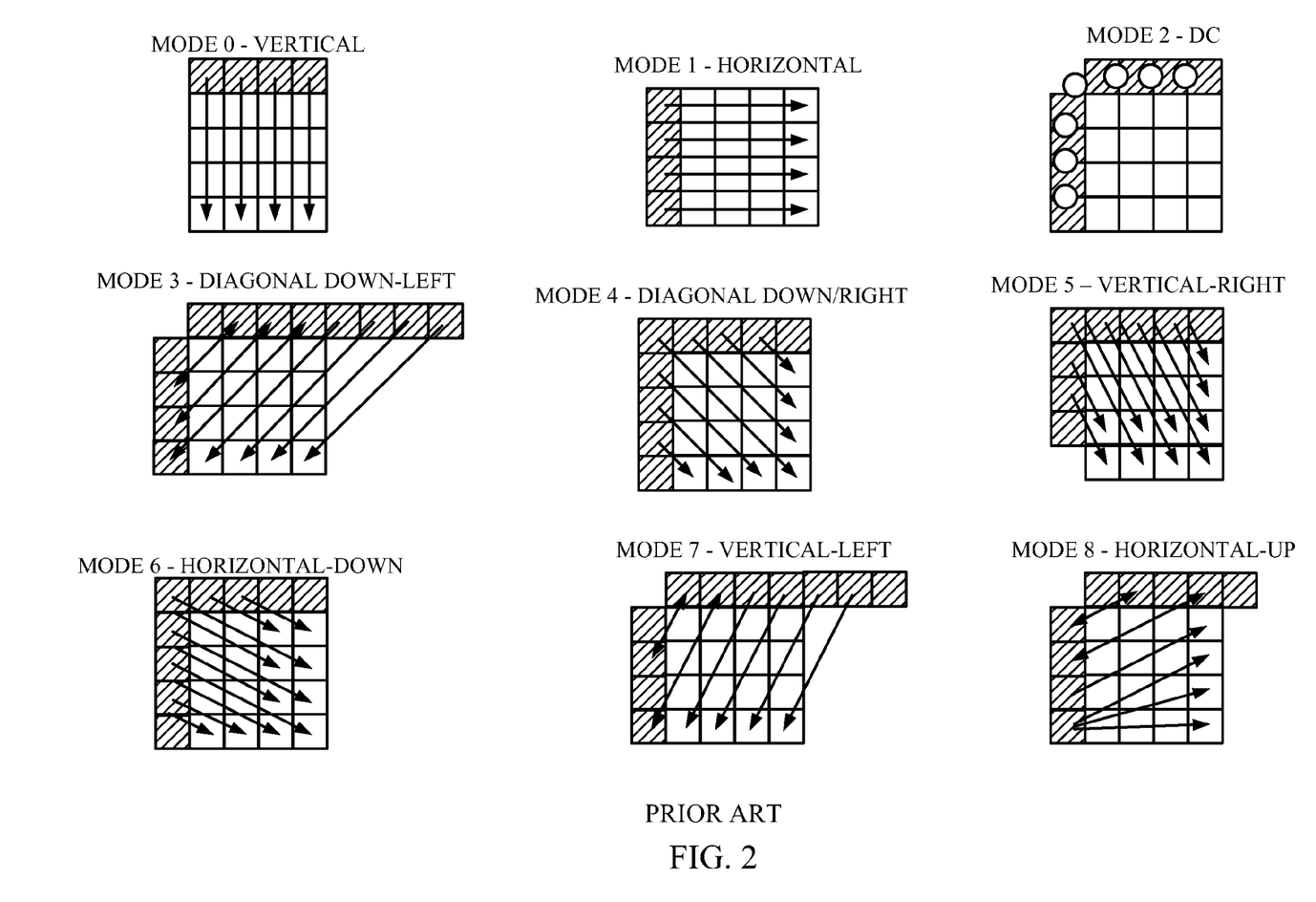
FIG. 2 shows prediction modes described in H.264-2005.
Figure 3:
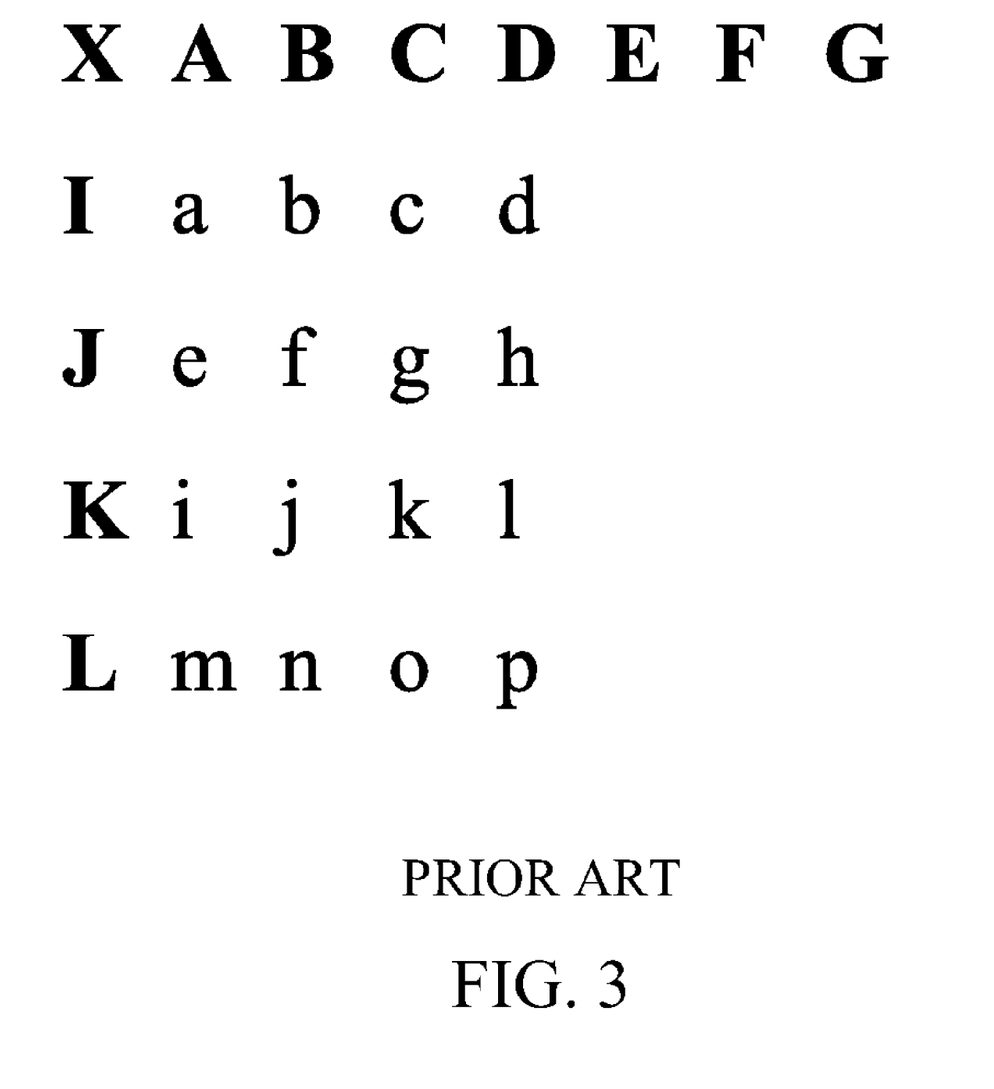
FIG. 3 illustrates pixel prediction using prediction modes.

An example of a spatial predictor 102 in FIG. 1 is herein described with reference to section 8.3.1 of ITU-T Recommendation H.264, published by ITU—Telecommunication Standardization Sector in March 2005, hereinafter referred to as H.264-2005. In H.264-2005, a coder offers 9 prediction modes for prediction of 4×4 blocks, including DC prediction (Mode 2) and 8 directional modes, labeled 0 through 8, as shown in FIG. 2. Each prediction mode specifies a set of neighboring pixels for encoding each pixel, as illustrated in FIG. 3. In FIG. 3, the pixels from a to p are to be encoded, and neighboring pixels A to L and X are used for predicting the pixels a to p.

To describe the spatial prediction, a nomenclature may be specified as follows. Let s denote a vector containing pixel values from neighboring blocks (e.g., values of pixels A to X in FIG. 3 form a 1×12 vector s), and $s_A$ denote the element of vector s corresponding to pixel A, etc. Let p denote a vector containing the pixel values for the block to be predicted (e.g., values of pixels a to p in FIG. 3 form a 1×16 vector p), and $p_a$ denote the element of vector p corresponding to pixel a, etc. Further let $w^d$ denote a matrix of weights to be multiplied to the vector s to obtain the vector p when a prediction mode d is specified. $w^d$ may be expressed as follows (Equation 1):

$$w^d = \begin{bmatrix} w^d_{a,A} & w^d_{a,B} & \cdots & w^d_{a,X} \\ w^d_{b,A} & & & \\ \vdots & & \ddots & \\ w^d_{p,A} & & & w^d_{p,X} \end{bmatrix}$$

The vector of predicted pixels p may then be expressed as follows (Equation 2):

$$p = w^d \cdot s$$

$$\begin{bmatrix} p_a \\ p_b \\ \vdots \\ p_p \end{bmatrix} = \begin{bmatrix} w^d_{a,A} & w^d_{a,B} & \cdots & w^d_{a,X} \\ w^d_{b,A} & & & \\ \vdots & & \ddots & \\ w^d_{p,A} & & & w^d_{p,X} \end{bmatrix} \begin{bmatrix} s_A \\ s_B \\ \vdots \\ s_X \end{bmatrix}$$

According to H.264-2005, if, for example, Mode 0 is selected, then pixels a, e, i and m are predicted by setting them equal to pixel A, and pixels b, f, j and n are predicted by setting them equal to pixel B, etc. Each set of pixels in Mode 0 corresponds to pixels lying along a single vertical direction, as shown in FIGS. 2 and 3. The relationships of the predicted to neighboring pixels for Mode 0 may be represented as follows (Equations 3):

$$w^0_{a,A} = w^0_{e,A} = w^0_{i,A} = w^0_{m,A} = 1;$$

$$w^0_{b,B} = w^0_{f,B} = w^0_{j,B} = w^0_{n,B} = 1;$$

$$w^0_{c,C} = w^0_{g,C} = w^0_{k,C} = w^0_{o,C} = 1;$$

$$w^0_{d,D} = w^0_{h,D} = w^0_{l,D} = w^0_{p,B} = 1;$$

and all other $w^0 = 0$.

On the other hand, if Mode 1 is selected, pixels a, b, c and d are predicted by setting them equal to pixel I, and pixels e, f, g and h are predicted by setting them equal to pixel J, etc. In this case, each set of pixels corresponds to pixels lying along a single horizontal direction, also as shown in FIGS. 2 and 3. The relationships for Mode 1 may be represented as follows (Equations 4):

$$w^1_{a,I} = w^1_{b,I} = w^1_{c,I} = w^1_{d,I} = 1;$$

$$w^1_{e,J} = w^1_{f,J} = w^1_{g,J} = w^1_{h,J} = 1;$$

$$w^1_{i,K} = w^1_{j,K} = w^1_{k,K} = w^1_{l,K} = 1;$$

$$w^1_{m,L} = w^1_{n,L} = w^1_{o,L} = w^1_{p,L} = 1;$$

and all other $w^1 = 0$.

Note that the modes given in H.264-2005 all specify setting the pixels along a single direction (e.g., the vertical direction in Mode 0, and the horizontal direction in Mode 1) equal to each other, and to a single neighboring pixel. While this is straightforward to implement and specify, in some cases it may be advantageous to set pixels along a single direction to values that are different from each other, and/or a combination of more than one neighboring pixel.

SUMMARY

An aspect of the present disclosure provides a method for encoding an image block, the image block comprising a set of pixel values, the method comprising selecting a prediction mode for predicting pixels in the image block based on neighboring pixels, the prediction mode specifying the predicted value of at least one pixel in the image block as a combination of at least two neighboring pixels.

Another aspect of the present disclosure provides a method for predicting an image block, the image block comprising a set of pixel values, the method comprising receiving a prediction mode for predicting pixels in the image block based on neighboring pixels; and generating a predicted block based on the neighboring pixels and the prediction mode, the generating comprising combining at least two neighboring pixels to predict at least one pixel in the image block.

Yet another aspect of the present disclosure provides an apparatus for encoding an image block, the image block comprising a set of pixel values, the apparatus comprising a spatial predictor for selecting a prediction mode for predicting pixels in the image block based on neighboring pixels, the prediction mode specifying the predicted value of at least one pixel in the image block as a combination of at least two neighboring pixels. In some examples, the apparatus is a handset.

Yet another aspect of the present disclosure provides an apparatus for predicting an image block, the image block comprising a set of pixel values, the apparatus comprising an inverse spatial prediction block, the block receiving a prediction mode for predicting pixels in the image block based on neighboring pixels, the block combining at least two neighboring pixels to predict at least one pixel in the image block. In some examples, the apparatus is a handset.

Yet another aspect of the present disclosure provides a computer program product for predicting an image block, the image block comprising a set of pixel values, the product comprising computer-readable medium comprising code for causing a computer to receive a prediction mode for predicting pixels in the image block based on neighboring pixels; and code for causing a computer to generate a predicted block based on the neighboring pixels and the prediction mode, the code causing the computer to combine at least two neighboring pixels to predict at least one pixel in the image block.

DETAILED DESCRIPTION

Disclosed herein are techniques to set pixels along a single direction to values that are different from each other, and/or a combination of more than one neighboring pixel.

In one aspect, for a prediction mode, each pixel along a single direction may be specified independently of other pixels along the same direction. For example, for Mode 0, the elements of the matrix $w^0$ may be modified as follows (Equations 5):

$$w^0_{a,A} = 1;$$

$$w^0_{e,A} = 0.9;$$

$$w^0_{i,A} = 0.8;$$

$$w^0_{m,A} = 0.7;$$

and other elements of $w^0$ preserved as according to Equations 1. As shown in Equations 5, each of the pixels a, e, i, and m is predicted based on the neighboring pixel A, but each pixel has a different weight as compared to the other pixels.

Note that the specification of the matrix $w^d$ is provided to both encoder and decoder, so that the decoder has a priori knowledge of $w^d$ for each prediction mode. Thus, no additional signaling between encoder and decoder is required beyond that shown in the embodiments of FIGS. 1 and 1A. Note also that Equations 5 are provided only to illustrate specifying each pixel independently of others, and are not meant to limit the disclosure to any specific values shown for the matrix $w^0$.

The decoder, receiving the prediction mode d, and having a priori knowledge of the matrix $w^d$ may decode the encoded block as shown in FIG. 1A.

In conjunction with or alternatively to the aspect described above, another aspect provides that, for a prediction mode, each pixel along a single direction may be specified as a combination of two or more neighboring pixels. For example, for Mode 0, the elements of the matrix $w^0$ for Mode 0 may be modified as follows (Equations 6):

$$w^0_{a,A} = 0.5;$$

$$w^0_{a,B} = 0.5;$$

while other elements of $w^0$ are unchanged from Equations 3. The predicted value ($p_a$) corresponding to the pixel a in FIG. 3 may then be expressed as follows (Equation 7):

$$p_a = [w^0_{a,A} \quad w^0_{a,B} \quad \cdots \quad w^0_{a,X}] \begin{bmatrix} s_A \\ s_B \\ \vdots \\ s_X \end{bmatrix} = 0.5 s_A + 0.5 s_B$$

Note the values for $w^0$ in Equations 6 are provided only as an illustration, and should not be interpreted to limit the disclosure to the values provided.

In an embodiment, the above two aspects can be combined. For example, weights can be assigned such that pixels to be encoded along the same direction are weighted progressively less in favor of one or more originating encoding pixels, as the distance from the originating pixel increases. Similarly, progressively more weight may be assigned to the encoding pixels surrounding the pixels to be encoded as the distance from the originating pixel increases.

Figure 4A:
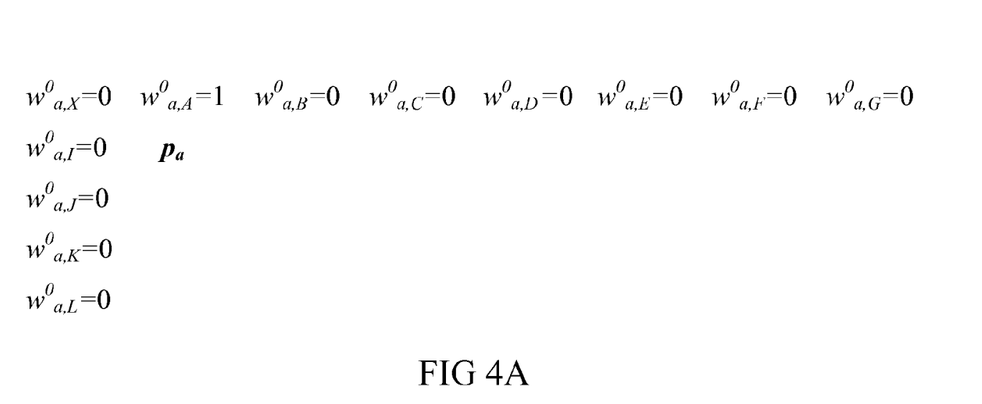
FIGS. 4A-4D show a pictorial representation of the elements of matrix w0 for the pixels a, e, i, and m.
Figure 4B:
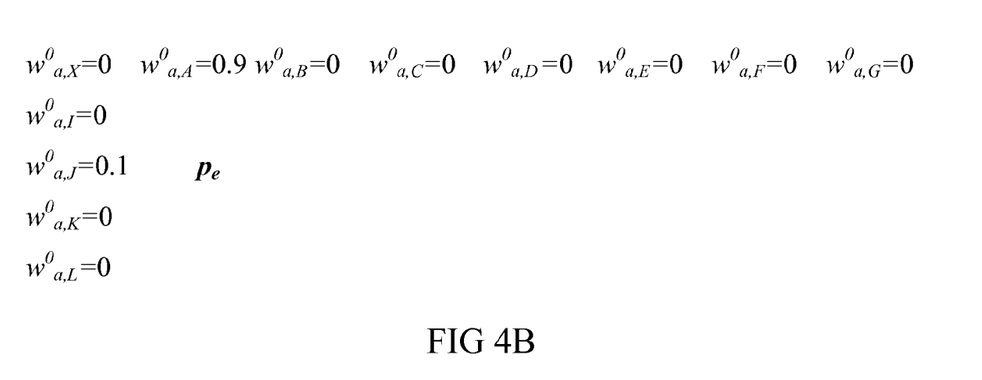
Figure 4C:
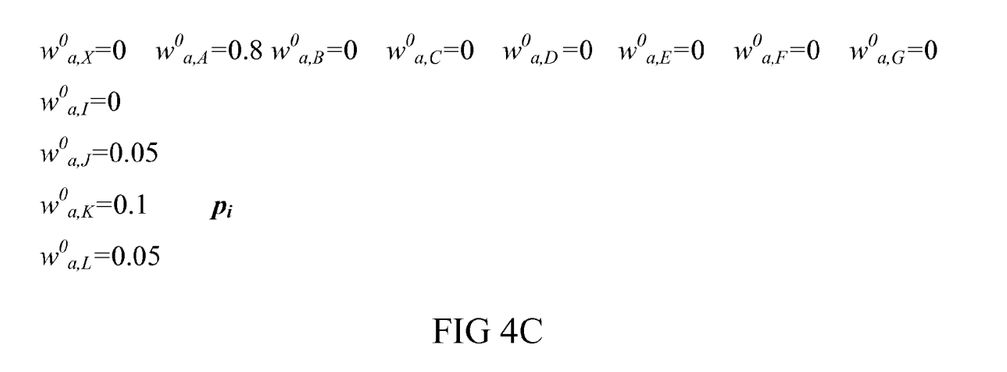
Figure 4D:
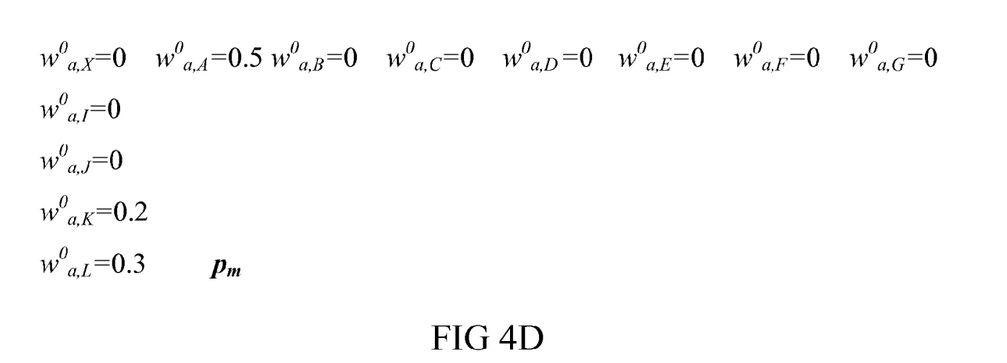

To illustrate this embodiment, FIGS. 4A-4D show a pictorial representation of the elements of matrix w0 for the pixels a, e, i, and m. FIG. 4A shows a pictorial representation of the elements of matrix $w^0$ for pixel a ($p_a$). In FIG. 4A, neighboring pixel A is considered the originating encoding pixel. As shown, for pixel a, only weight $w^0_{a,A}$ is assigned a non-zero weight of 1. FIG. 4B shows weight assignments for pixel e. As shown, pixel e is assigned a different set of weights from pixel a, i.e., $w^0_{a,A}=0.9$, and $w^0_{a,f}=0.1$. FIG. 4C shows weight assignments for pixel i. For pixel i, $w^0_{a,A}=0.8$, $w^0_{a,f}=0.05$, $w^0_{a,K}=0.1$, and $w^0_{a,L}=0.05$. FIG. 4D shows weight assignments for pixel m. For pixel m, $w^0_{a,A}=0.5$, $w^0_{a,K}=0.2$, and $w^0_{a,L}=0.3$.

Note that the weight assignments in FIGS. 4A-4D are intended to serve only as illustrations, and are not meant to limit the scope of the present disclosure to any particular values of weights shown.

In an embodiment, the sum of all weights used to encode a single pixel can be set to 1, as shown in FIGS. 4A-4D.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

The invention claimed is:

1. A method for encoding an image block, the image block comprising a set of pixel values, the method comprising:
   selecting a prediction mode for predicting pixels in the image block based on neighboring pixels, the prediction mode specifying a predicted value of at least one pixel in the image block as a combination of at least two neighboring pixels, the prediction mode further specifying a direction to be used for prediction, each pixel along a single direction being a function of at least one neighboring pixel, and at least two of the pixels along the single direction being different functions of the at least one neighboring pixel.

2. The method of claim 1, the combination of at least two neighboring pixels comprising the sum of a first weight times a first of the at least two neighboring pixels and a second weight times a second of the at least two neighboring pixels.

3. The method of claim 2, the prediction mode further specifying a weight matrix for encoding each pixel in the image block by specifying the weights to be assigned to each neighboring pixel for each pixel in the image block.

4. The method of claim 1, the at least two of the pixels along the single direction being different functions of at least two neighboring pixels.

5. A method for predicting an image block, the image block comprising a set of pixel values, the method comprising:
   receiving a prediction mode for predicting pixels in the image block based on neighboring pixels, the prediction mode specifying a direction to be used for prediction, each pixel along a single direction being a function of at least one neighboring pixel, and at least two of the pixels along the single direction being different functions of the at least one neighboring pixel; and
   generating a predicted block based on the neighboring pixels and the prediction mode, the generating comprising combining at least two neighboring pixels to predict at least one pixel in the image block.

6. The method of claim 5, the combining at least two neighboring pixels comprising adding a first weight times a first of the at least two neighboring pixels and a second weight times a second of the at least two neighboring pixels.

7. The method of claim 6, the generating comprising, for each pixel in the image block, weighting each neighboring pixel according to a weight matrix.

8. The method of claim 5, the at least two of the pixels along the single direction being different functions of at least two neighboring pixels.

9. An apparatus for encoding an image block, the image block comprising a set of pixel values, the apparatus comprising:
   a spatial predictor for selecting a prediction mode for predicting pixels in the image block based on neighboring pixels, the prediction mode specifying a predicted value of at least one pixel in the image block as a combination of at least two neighboring pixels, the prediction mode further specifying a direction to be used for prediction, each pixel along a single direction being a function of at least one neighboring pixel, and at least two of the pixels along the single direction being different functions of the at least one neighboring pixel.

10. The apparatus of claim 9, the combination of at least two neighboring pixels comprising the sum of a first weight times a first of the at least two neighboring pixels and a second weight times a second of the at least two neighboring pixels.

11. The apparatus of claim 10, the prediction mode further specifying a weight matrix for encoding each pixel in the image block by specifying the weights to be assigned to each neighboring pixel for each pixel in the image block.

12. The apparatus of claim 9, the at least two of the pixels along the single direction being different functions of at least two neighboring pixels.

13. The apparatus of claim 9, wherein the apparatus is a handset.

14. The apparatus of claim 9, wherein the apparatus is an integrated circuit.

15. An apparatus for predicting an image block, the image block comprising a set of pixel values, the apparatus comprising:
- an inverse spatial prediction block, the block receiving a prediction mode for predicting pixels in the image block based on neighboring pixels, the block combining at least two neighboring pixels to predict at least one pixel in the image block, the prediction mode specifying a direction to be used for prediction, each pixel along a single direction being a function of at least one neighboring pixel, and at least two of the pixels along the single direction being different functions of the at least one neighboring pixel.

16. The apparatus of claim 15, the combining at least two neighboring pixels comprising adding a first weight times a first of the at least two neighboring pixels and a second weight times a second of the at least two neighboring pixels.

17. The apparatus of claim 16, the inverse spatial predictor predicting each pixel by weighting each neighboring pixel according to a weight matrix.

18. The apparatus of claim 15, the at least two of the pixels along the single direction being different functions of at least two neighboring pixels.

19. The apparatus of claim 15, wherein the apparatus is a handset.

20. The apparatus of claim 15, wherein the apparatus is an integrated circuit.

21. A computer program product for predicting an image block, the image block comprising a set of pixel values, the product comprising:
- a non-transitory computer-readable medium storing computer-executable code that, when executed by a computer, causes the computer to:
  - receive a prediction mode for predicting pixels in the image block based on neighboring pixels, the prediction mode specifying a direction to be used for prediction, each pixel along a single direction being a function of at least one neighboring pixel, and at least two of the pixels along the single direction being different functions of the at least one neighboring pixel; and
  - generate a predicted block based on the neighboring pixels and the prediction mode, the code causing the computer to combine at least two neighboring pixels to predict at least one pixel in the image block.

* * * * *